Patented Sept. 16, 1941

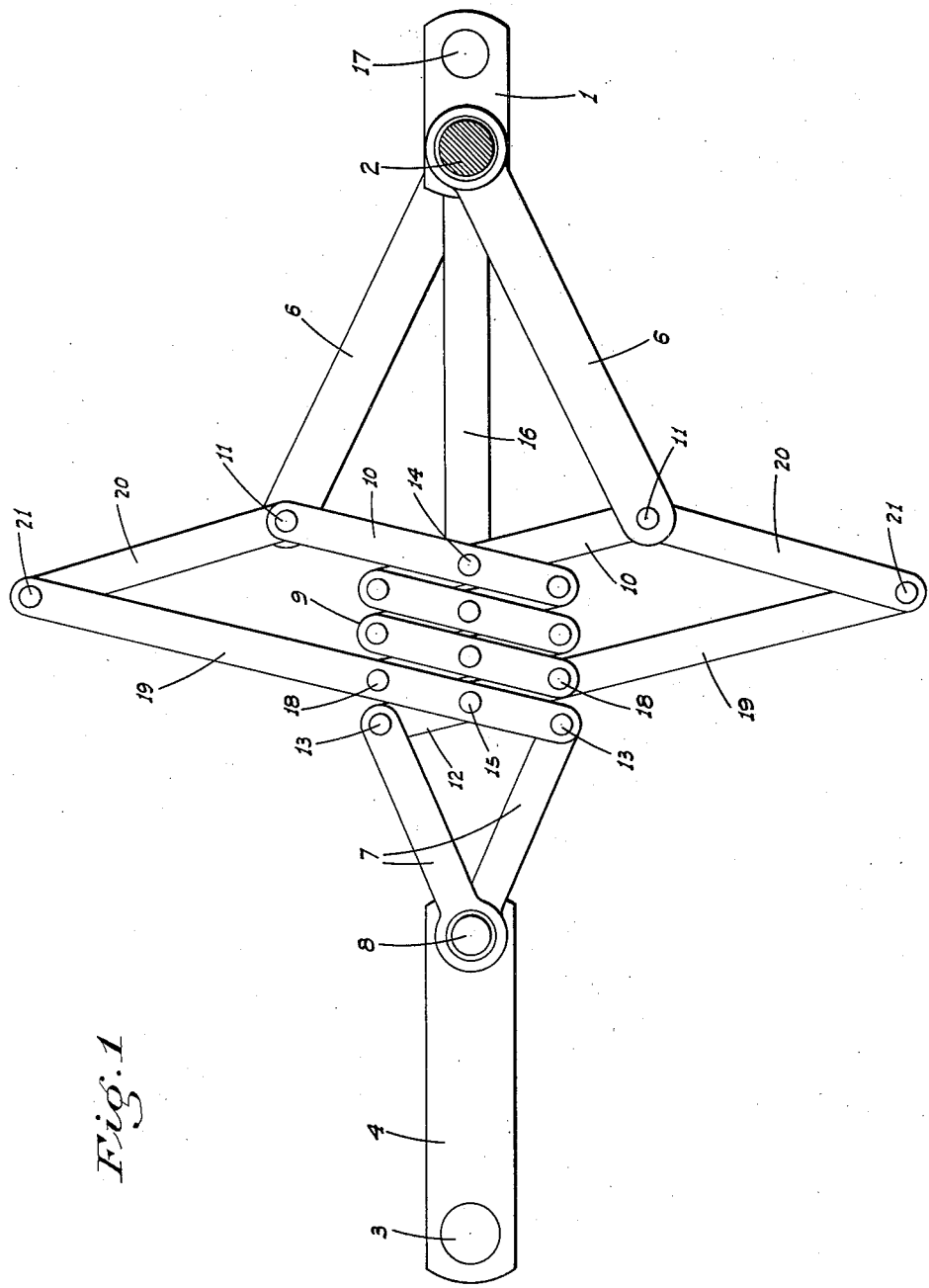

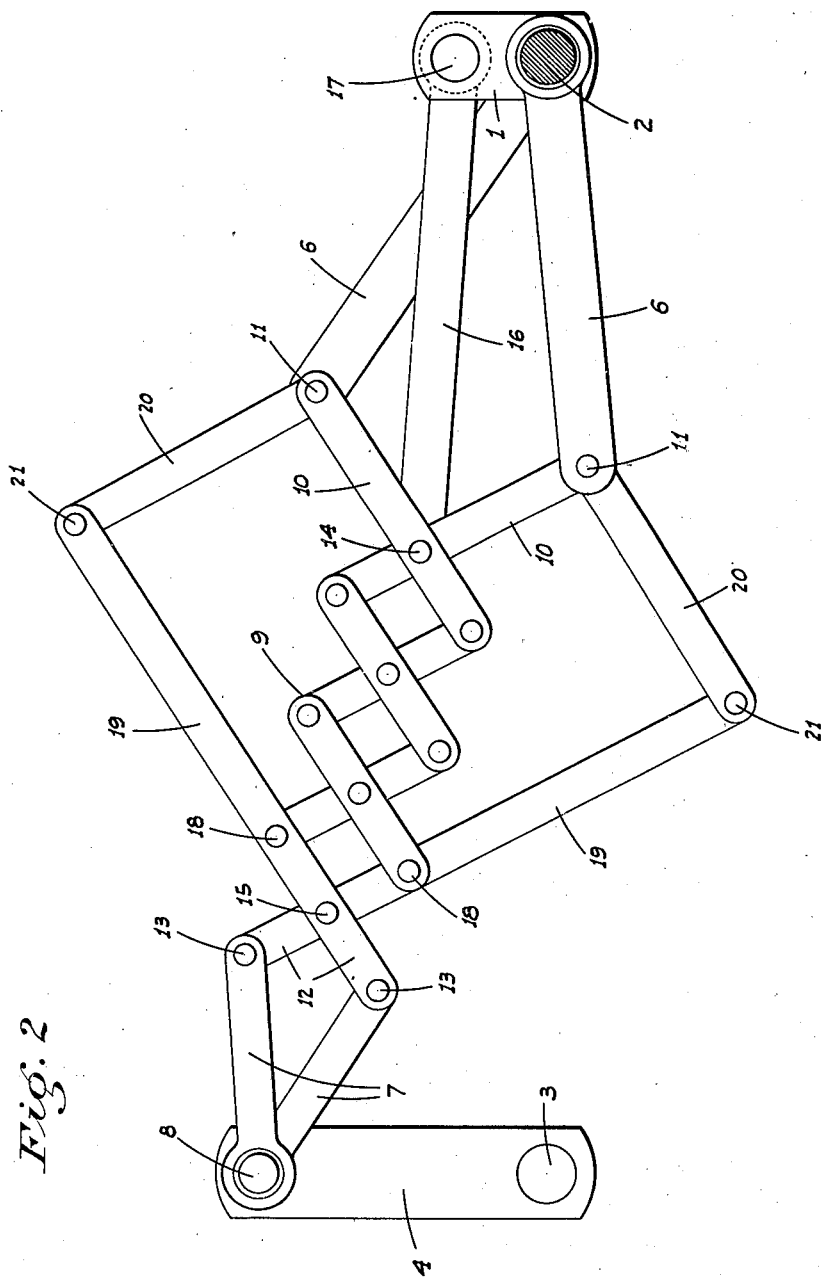

2,256,075

UNITED STATES PATENT OFFICE 2,256,075

CONNECTING ROD

Raphael Du Coe, Sonora, Calif.

Application May 13, 1940, Serial No. 334,833

6 Claims. (Cl. 74—67)

This invention relates generally to power transmitting mechanism, and in particular the invention is directed to an improved connecting rod unit or assembly.

The principal object of the invention is to provide a connecting rod unit adapted for connection between a rotatable driving member and a rotatable driven member, and arranged so that upon rotation of the driving member at a given speed, the driven member is rotated at the same speed but with an increased torque.

Another object of the invention is to provide a connecting rod unit adapted for connection between the cranks of a driving crank shaft and a driven crank shaft; the unit being so designed that the driven crank shaft is rotated at the same speed as the driving crank shaft but with multiplied torque as the driven crank is of a greater length or throw than that of the driving crank.

An additional object is to provide a connecting rod unit, as above, which embodies a mechanically extensible and contractable power transmitting linkage assembly.

A further object of the invention is to produce a simple, inexpensive, efficient and economical device and one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is an elevation of the connecting rod unit in contracted position.

Figure 2 is an elevation of the unit in partially extended position.

Referring now more particularly to the characters of reference on the drawings, the numeral 1 indicates the crank of the driving crank shaft 2; the driven crank shaft 3 being spaced from but parallel to crank shaft 2. The crank 4 of driven crank shaft 3 is of a multiplied length or throw relative to crank 1 (in this instance 3 to 1), and such cranks are opposed and alined for the connection of the connecting rod unit therebetween.

The connecting rod unit comprises generally a mechanically extensible and contractable linkage assembly wherein the several links are disposed for pivotal movement in substantially the same plane, and are pivoted with the pivotal axes thereof all parallel to the axis of both the crank shafts; said linkage assembly in detail comprising the following:

A pair of links 6, hereinafter identified as anchor links, are turnably mounted at one end on the crank shaft 2 adjacent crank 1; such links projecting in diverging relation toward crank 4. Another pair of links 7, hereinafter identified as the driven links, are turnably mounted on the crank pin 8 of crank 4 and project in diverging relation toward crank 1.

A "criss-cross" or "lazy tongs" linkage assembly, indicated generally at 9, extends between the diverging anchor links 6 and diverging driven links 7; the initially free ends of the intersecting end links 10 at one end of the assembly 9 being pivoted at 11 in connection with the adjacent and corresponding ends of anchor links 6, while the initially free ends of the intersecting end links 12 at the other end of said assembly 9 are pivoted at 13 in connection with the adjacent and corresponding ends of driven links 7. The length of links 10 between the pivot 14 at the intersection thereof and the pivots 11 is of predetermined greater length than the corresponding portion of links 12 between the intersection pivot 15 and pivots 13. Except as indicated herein, the links forming linkage assembly 9 are of equal length.

A connecting link or rod 16 is turnably mounted at one end on the crank pin 17 of crank 1, while the other end of such link is pivotally connected with pivot 14 at the intersection of links 10; said link 16 being of somewhat greater length than anchor links 6.

Pivots 18 connect links 12 with the lazy tongs linkage assembly 9 at points spaced from pivot 15 the same distance as pivots 13 but in the opposite direction. Beyond pivots 18 links 12 are extended longitudinally as at 19 for a predetermined length; said extensions 19 when taken with links 12 forming what may be termed power levers. Connector links 20 are pivoted at one end on pivots 11, and at the other end are pivoted at 21 on the outer ends of extensions 19; links 20 being shorter than extensions 19.

In operation, and upon rotation of crank 1, the connecting rod assembly above described recurringly extends and contracts and with such action imparts rotation to crank shaft 3 at the same speed as crank shaft 2 but with an increased torque; the length of the cranks being in the ratio of 3 to 1 with the driven crank 4 of course having the greatest throw.

My improved connecting rod assembly may be put to many uses as a power transmitting mechanism, and to effectively and economically transmit rotative action from one member to another without loss of speed and with an increased torque as previously described.

In order that the throw of the cranks be in the ratio of 3 to 1, as in the instant structure, the relative lengths of the several linkages must be in certain definite proportions as shown in the drawings. Of course if a different crank ratio is desired, then such proportions of the linkages would have to be varied correspondingly.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A reciprocable driving connection between corresponding cranks of spaced parallel drive and driven crank shafts, the driven crank having a greater throw than the drive crank, said connection comprising a lazy tongs linkage assembly connected between the shaft of the drive crank and the crank pin of the driven crank, and means including an instrumentality connected with the crank pin of the drive crank to effect a positive extension and contraction of the linkage assembly upon rotation of the drive crank, the differential in length of said assembly corresponding to the relatively greater throw of the driven cranks.

2. A reciprocable driving connection between corresponding cranks of spaced parallel drive and driven crank shafts, the driven crank having a greater throw than the drive crank, said connection comprising a lazy tongs linkage assembly connected between the shaft of the drive crank and the crank pin of the driven crank, means connected between the crank pin of the drive crank and said linkage assembly to effect an alternate extension and contraction thereof with each full rotation of said drive crank, and other means connected with the linkage assembly and arranged so that the end of the linkage assembly connected with the crank pin of the driven crank advances and retracts a distance corresponding to the throw of said driven crank upon extension and contraction of the linkage assembly.

3. A reciprocable driving connection between corresponding cranks of spaced parallel drive and driven crank shafts, the driven crank having a greater throw than the drive crank, said connection comprising a pair of links turnably mounted at one end on the shaft of the drive crank and diverging therefrom, another pair of links turnably mounted on the crankpin of the driven crank and diverging therefrom, a lazy tongs linkage assembly extending between said pairs of links, the intersecting end links at the ends of said linkage assembly being pivoted at their initially free ends on the adjacent and corresponding ends of said pairs of links, a connecting link turnably mounted at one end on the crank pin of the drive crank and pivoted at the other end with the adjacent intersecting end links of said linkage assembly at the point of intersection thereof, and means associated with said linkage assembly arranged so that upon rotation of the driven crank and reciprocation of the connecting link, the linkage assembly is recurringly and positively extended and contracted to an extent that the differential in length thereof corresponds to the relatively greater throw of the driven crank.

4. A structure as in claim 3 in which the connecting link is of substantially greater length than the length of the links of said first named pair.

5. A structure as in claim 3 in which the connecting link is of substantially greater length than the length of the links of said first named pair, and in which the links of said pair are of greater length than the length of said adjacent end links between the point of intersection thereof and the point of connection thereof with the corresponding ones of said pair of links.

6. A reciprocable driving connection between corresponding cranks of spaced parallel drive and driven crank shafts, the driven crank having a greater throw than the drive crank, said connection comprising a pair of links turnably mounted at one end on the shaft of the drive crank and diverging therefrom, another pair of links turnably mounted on the crank pin of the driven crank and diverging therefrom, a lazy tongs linkage assembly extending between said pairs of links, the intersecting end links at the ends of said linkage assembly being pivoted at their initially free ends on the adjacent and corresponding ends of said pairs of links, a connecting link turnably mounted at one end on the crank pin of the drive crank and pivoted at the other end with the adjacent intersecting end links of said linkage assembly at the point of intersection thereof, the intersecting end links at the other end of the linkage assembly being extended longitudinally a substantial distance in a direction opposite from the links of said other pair, and connector links pivoted between the outer ends of said extended end links and the adjacent ends of said first named pair of links.

RAPHAEL DU COE.